United States Patent [19]

Cahill et al.

[11] Patent Number: 5,084,252

[45] Date of Patent: Jan. 28, 1992

[54] METHOD AND MEANS FOR CONTINUOUS PRECIPITATION OF EASY-DRY, GRANULAR URANIUM PEROXIDE

[75] Inventors: Allen E. Cahill, Roland; Lawrence E. Burkhart, deceased, late of Ames, both of Iowa, by Janice E. Burkhart, executrix

[73] Assignee: Iowa State University Research Foundation, Inc., Ames, Iowa

[21] Appl. No.: 585,608

[22] Filed: Sep. 20, 1990

[51] Int. Cl.$^5$ .............. C01G 43/01; C01G 1/02; G21C 19/46; B01F 7/00

[52] U.S. Cl. ............................. 423/16; 423/11; 423/15; 422/159; 422/224; 422/225; 422/227; 422/228

[58] Field of Search ............... 422/159, 224, 225, 226, 422/227, 228; 423/11, 16, 15

[56] References Cited

U.S. PATENT DOCUMENTS

| | | | |
|---|---|---|---|
| 2,385,128 | 6/1973 | Castner | 422/225 |
| 2,551,543 | 5/1951 | Mohr | 23/14.5 |
| 2,727,806 | 12/1955 | Forward et al. | 423/11 |
| 2,764,470 | 9/1956 | Richardson et al. | 423/16 |
| 2,769,780 | 11/1956 | Clifford et al. | 252/626 |
| 2,770,521 | 11/1956 | Spiegler | 23/14.5 |
| 2,771,338 | 11/1956 | Spiegler | 423/16 |
| 2,780,515 | 2/1957 | Miller et al. | 423/16 |
| 3,086,841 | 4/1963 | Hart et al. | 23/14.5 |
| 3,115,388 | 12/1963 | Goren | 23/14.5 |
| 4,024,215 | 5/1977 | Caropreso et al. | 423/16 |
| 4,152,395 | 5/1979 | Borner et al. | 423/16 |
| 4,228,132 | 10/1980 | Weems et al. | 422/174 |
| 4,271,127 | 6/1981 | Borner et al. | 422/159 |
| 4,272,490 | 6/1981 | Sefton et al. | 423/18 |
| 4,311,341 | 1/1982 | DeVries et al. | 299/5 |
| 4,425,307 | 1/1984 | DeVries | 423/20 |
| 4,428,911 | 1/1984 | Hardwick | 423/16 |
| 4,438,077 | 3/1984 | Tsui | 423/7 |
| 4,485,075 | 11/1984 | Maurel | 423/55 |
| 4,486,392 | 12/1984 | Heckmann et al. | 423/11 |
| 4,530,823 | 7/1985 | Dugua | 423/260 |
| 4,765,834 | 8/1988 | Ananthapadmanabhan | 75/108 |
| 4,929,430 | 5/1990 | Otomura et al. | 423/11 |

OTHER PUBLICATIONS

Shabbir and Tame, "Hydrogen Peroxide Prtecipitaton of Uranium", U.S. Dept. of Interior, Bureau of Mines (1974).

McCabe et al., Unit Apparatus of Chemical Engineering, 3rd Ed., McGraw-Hill, 1976, pp. 226-229.

Mead, W. J., The Encyclopedia of Chemical Process Equipment, Reinhold Publishing, 1964, pp. 956-959.

Lash, L. D., The Shrouded Mixar Impeller in Solvent Extraction of Uranium, *Mixing Engineering* Nov. 1958, pp. 1161-1164.

Primary Examiner—Brooks H. Hunt
Assistant Examiner—Daniel Jenkins
Attorney, Agent, or Firm—Zarley, McKee, Thomte, Voorhees & Sease

[57] ABSTRACT

A method and means for continuous precipitation of granular uranium peroxide. The reaction vessel and agitation method practiced in it avoid filter plugging and caking problems.

4 Claims, 1 Drawing Sheet

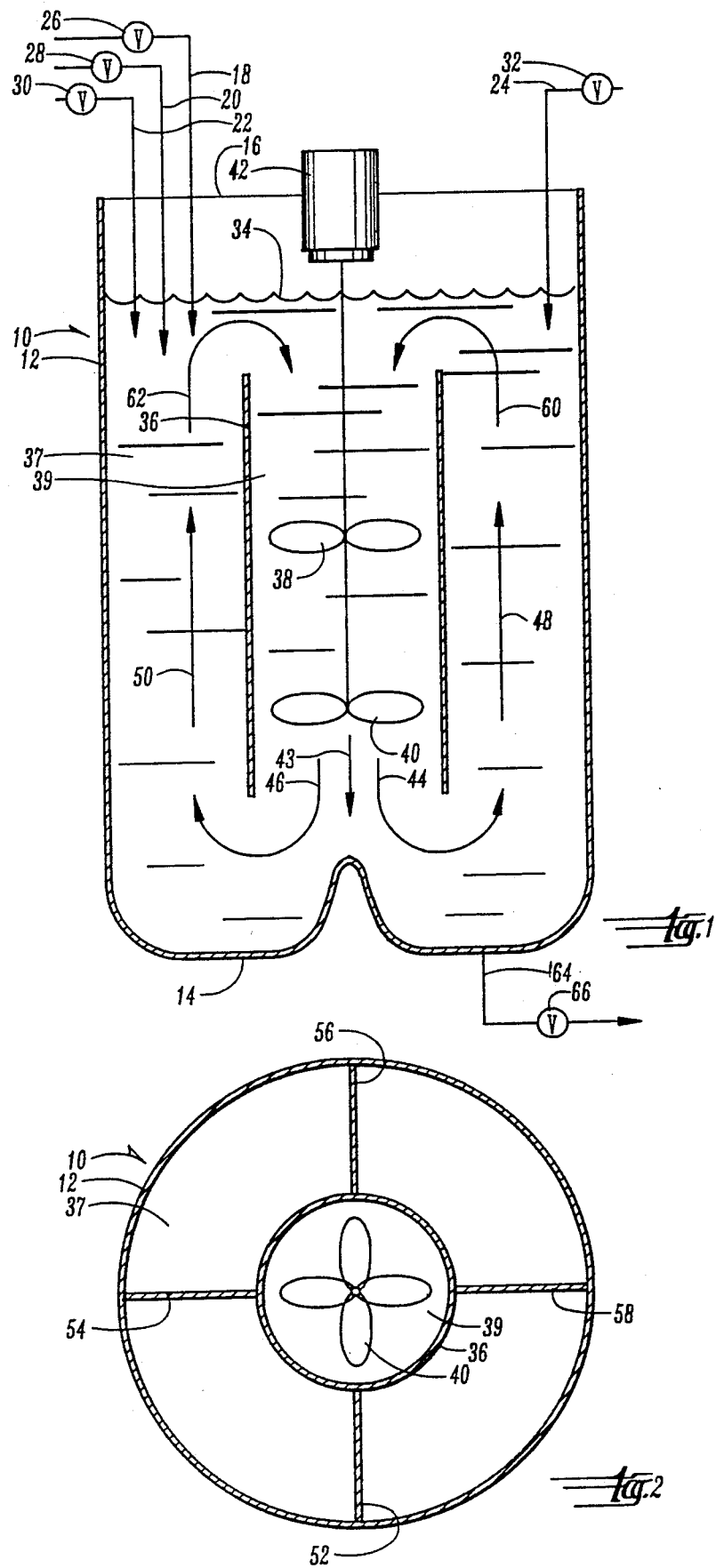

METHOD AND MEANS FOR CONTINUOUS PRECIPITATION OF EASY-DRY, GRANULAR URANIUM PEROXIDE

GRANT REFERENCE

This work was supported in part by the Director of Energy Research Office of Basic Energy Sciences, U.S. Dept. of Energy, Contract No. W-7405-ENG-82, and the government may have certain rights in this invention.

BACKGROUND OF THE INVENTION

The ores from which uranium is extracted commercially contain only about 0.1% of the element, and the first step, after preconcentration by physical methods, is to leach out the uranium with sulfuric acid or sodium carbonate; it is also possible in some cases to leach the uranium directly from the natural deposit in situ. If sodium carbonate is used, the solution must subsequently be converted to an acid solution. The uranium is then recovered by precipitation with either ammonia or hydrogen peroxide. The ammonia is cheaper, but it precipitates other metallic elements along with the uranium, so that the overall processing, to obtain a suitable pure product, is not necessarily cheaper with ammonia; also, ammonia must be regarded as an environmental pollutant, whereas hydrogen peroxide decomposes to oxygen and water. Both ammonia and hydrogen peroxide are in use commercially. In either case the process of precipitation is a batch operation, and the precipitate is a very fine material which is slow to filter and packs to form a cake.

The solution from which the uranium is precipitated is commonly called mill solution. The present invention relates to an improved method of precipitating uranium peroxide from mill solution in the form of easy-dry, flowable granular particles of significantly increased bulk and flowability. As a result, the common problems of caking, plugging of filters, and the like, usually attendant with commercial ore processing of uranium are avoided.

As earlier indicated, typical uranium processing is usually accomplished by batch process recovery from in situ leach liquors. Batch process recovery is of course less economical than a continuous process might be, and it also seems to lend itself to having excessive amounts of certain impurities present. The impurities that are present often are vanadium and molybdenum, important naturally occurring impurities. These tend to remain in solution when hydrogen peroxide is used to extract uranium peroxide from the mill solution as the precipitant because they are oxidized to soluble perxo complexes $VO_5^{-3}$ and $MoO_5^{-2}$.

Other problems are attendant when there are high amounts of naturally occurring vanadium in the mill solution. Often the precipitation of the uranium becomes incomplete and the precipitate is contaminated with vanadium. This problem cannot simply be solved by increasing the hydrogen peroxide concentration.

Accordingly, it is a primary objective of the present invention to develop a continuous peroxide precipitation process which produces acceptably pure, fast filtering, easily handled (non-caking) granular form of solid product, uranium peroxide.

Another primary objective of the present invention is to replace the prior art normally used batch processes of uranium recovery from mill solutions with a continuous process which produces easily handleable fast filtering uranium peroxide precipitate.

A yet further objective of the present invention is to develop a process for recovery of uranium from mill solution by the uranium peroxide precipitation technique which can be successfully run, even in the presence of high concentrations of naturally occurring vanadium in the mill solution, even up to the levels of vanadium to uranium of 1:2.

The method and means of accomplishing the above objectives of the present invention will be apparent from the detailed description which will follow hereinafter.

SUMMARY OF THE INVENTION

A method and means for continuous precipitation of easy-dry and flowable granular form uranium peroxide. The uranium peroxide is precipitated in a reaction vessel which has an interiorly disposed draft tube having open upper and lower ends positioned in a precipitation tank such that the tank is divided into an outer reaction zone and an interior reaction zone. The mill solution and reacting peroxide are continuously agitated inside of the draft tube to provide a continually downwardly moving stream of reacting uranium solution. The solution moves out of the bottom of the draft tube upwardly and continually circulates parallel to the longitudinal axis of the draft tube. Baffles are positioned on the exterior wall of the draft tube to prevent rotation of solution about the longitudinal axis of the draft tube.

In the preferred process, a solution of sodium sulfate is fed into reaction tank to dilute the reaction solution to as much as 30% to 50by volume. As a result, the vanadium does not interfere with the uranium peroxide precipitation.

BRIEF DESCRIPTION OF THE DRAWINGS

FIG. 1 is a schematic of a perspective view of the reaction vessel of the present invention.

FIG. 2 is a plan view of the reaction vessel.

DETAILED DESCRIPTION OF THE INVENTION

The basic process and chemical logic for hydrogen peroxide precipitation of uranium from mill solutions is well-known, and need not be repeated in detail herein, see for example Shabbir and Tame, Hydrogen Peroxide Precipitation of Uranium, *Report of Investigations*. 7931, U.S. Bureau of Mines, Washington, D.C. 1974. In the Shabbir and Tame report a study was made to determine optimum conditions for precipitation of uranium from mill solutions using hydrogen peroxide. The parameters studied included the amount of hydrogen peroxide, initial pH, reaction pH, time and temperature, etc. The Shibbir et al. report does not report a continuous process, nor does it report the reaction vessel or the process that occurs in the reaction vessel of the present invention.

A brief review of the chemistry will set the stage for the invention. Although uranium may exist in several oxidation states ranging from +2 to +6, the hexavalent (uranyl) form is the most common one in aqueous solutions. It exists as a linear uranyl ion, $(UO_2)^{+2}$, around whose equator are six positions for the attachment of complexing ligands. The equatorial ligands are labile—they are in equilibrium with their environment. The uranyl group, on the other hand, is inert and may be assumed not to exchange its oxygens under ordinary reaction conditions.

When hydrogen peroxide is added to an acid solution (pH 2-3) in the absence of complexing ligands other than water and nitrate, uranium peroxide precipitates instantly. The precipitate so obtained is very finely divided and difficult to handle. In alkaline solution, in the absence of an appropriate complexing agent, U(VI) is insoluble, and a slime of hydrous uranium oxide forms; two moles of hydrogen peroxide per mole of uranium can keep the uranium in alkaline solution as the di-peroxo complex. If the pH is then lowered to 4-5, uranium peroxide will precipitate, and the excess peroxide released from the complex will remain in the solution. The precipitate is again fine and difficult to handle, although not as fine as that obtained by precipitation from acid solution.

Certain complexing ligands, notably $SO_4^{2-}$, can delay, and in sufficiently high concentrations, essentially inhibit the precipitation of uranium peroxide over any reasonable period of time. If sulfate is present in an acid solution of uranium, a complex forms in which sulfate ions are attached at equatorial positions of the uranyl ion. When peroxide is added, equilibrium is established between insoluble uranium peroxide and soluble uranium peroxide sulfate complexes. Thus sulfate has the effect of reducing the concentration of the precipitating species and slows the rate of precipitation. As the pH is raised, the equilibrium shifts toward the insoluble uranium peroxide, and at a pH of 4-5 complete precipitation of the uranium can be obtained in at most a few hours.

When precipitation is carried out from an initially alkaline solution, the equilibrium evidently shifts from the soluble uranium di-peroxo sulfate complex toward the insoluble uranium peroxide species as the solution is made less alkaline, and complete precipitation of the uranium will occur in a few hours or less at a pH of 4-5.

Thus, uranium peroxide may be precipitated from a solution which is initially either acid or alkaline. The rate of precipitation is affected by the presence of complexing ligands which form soluble complexes. At a pH of 4-5, essentially complete precipitation is possible. The physical characteristics of the precipitate, such as size, size distribution, and morphology of the particles, depend on the precipitation route and upon the mechanics of mixing the reactants.

The fact that vanadium interferes with the peroxide precipitation of uranium is presumably due to the formation of a soluble uranium-vanadium complex. It has been noted by Boyd and Kustin, *Advances In Inorganic Biochemistry*. Vol. 6, p. 313 (Elsevier, 1984), that the vanadate ion "imitates" the phosphate ion. Thus, it is possible that vanadate binds directly to the uranyl ion. It is also significant that vanadate replaces up to three of its oxides with the peroxo, $O_2^{2-}$, ion, and the uranyl ion also complexes peroxo; thus, a binuclear U-OO-V could form. The formation of any uranium-vanadium complex would be expected to inhibit the precipitation of uranium peroxide.

There are three principal aspects to the present invention. The first is the development of a specifically designed reaction vessel which may be used as a single continuous stage or in two, three or more concurrent stages to provide a unique mixing to keep precipitated particles suspended in the reaction mill solution such that the precipitate as it forms is a good, easily processible granular uranium peroxide precipitate. The second aspect of the invention is the process carried out in the reaction vessel. The third aspect of the invention is an improvement that allows the process to be operated even in the presence of high vanadium impurity concentration in the mill solution without the vanadium interfering with the continuous precipitation of the desired physical form of uranium peroxide.

As earlier discussed, uranium peroxide precipitation can be practiced either as an acid process, an alkaline process, or a neutral process. The use of the reaction vessel and agitation system to provide the desired uranium peroxide particles of the present invention is applicable to all of these processes.

FIGS. 1 and 2 illustrate the process of the invention with regard to a schematically illustrated reaction vessel 10. The reaction vessel 10 has a continuous container wall 12, a bottom 14, and an open top 16. Reactant feed lines 18, 20, 22 and 24 are available to allow four separate feeds into the reaction vessel 10. Of course, each feed line has appropriate valves for opening and closing and metering reactant, respectively designated 26, 28, 30 and 32. Typical reactants will vary depending whether one is using an acid process, an alkaline process, or a neutral process. But the reactants may, for example, include sulfuric acid, hydrochloric acid, nitric acid, sodium hydroxide, hydrogen peroxide, sodium carbonate, and sodium sulfate. As illustrated in the examples, and as mentioned on several previous occasions, the method and means of the present invention is not necessarily dependent upon selecting any one of the uranium peroxide processing systems, but rather has the benefit of successful use in any one of those. By way of illustration, reactants in the acid process are sodium hydroxide, sodium sulfate, sulfuric acid, and hydrogen peroxide. These are fed into the reactor via lines 18, 20, 22 and 24 to fill the reactor to level 34. Interiorly positioned in reactor 10 is a cylindrical draft tube 36. Positioned in draft tube 36 are tandem impellers 38 and 40, powered by motor 42. Draft tube 36 has an open top and an open bottom, each in fluid communication with the fluid within tank 12. Thus, there is defined by the walls of tank 12 and the endless wall 36 an annular outer reaction zone 37 and an annular inner reaction zone 39 with zone 37 defined by wall 36 of draft tube and wall 12 of the tank, and the interior reaction zone 39 defined by the interior surface of wall 36.

In actual operation, the reaction vessel works in the following manner. Reactants for example as earlier described are metered in via lines 18, 20, 22 and 24, using either all or some of the lines. The reaction vessel tank is filled to the level of line 34 with reacting mill solution. Motor 42 is turned on so that agitating impellers 38 and 40 operate, typically at an RPM speed of from 400 rpm to 800 rpm. The agitation induced by impellers 38 and 40 causes reacting mill solution and peroxide inside of draft tube 36 to move downwardly in accordance with directional arrow 43 and thence outwardly in accordance with directional arrows 44 and 46. The high churning action caused by impellers 38 and 40 within the confined area of draft tube 36 causes the agitated reacting mill solution to move outwardly of the bottom end of discharge tube 36 via lines 44 and 46, thence upwardly in the annular defined space between wall 36 and wall 12 as illustrated by arrows 48 and 50. The material is kept from simply rotating about the long axis of down draft tube 36 via vertically positioned baffles 52, 54, 56 and 58 (see FIG. 2). Thus, the reactant mill solution travels upwardly via lines 48 and 50 and thence because of the spinning vortex type action created inside of down draft tube 36 back into the open top end of down draft tube 36 via lines 60 and 62.

This continual action, i.e. swirling and churning action within down draft tube 36, upward travel along the annular space between down draft tube 36 and the interior surface of wall 12 of tank 10 and thence return into down draft tube 36 via its open top, provides for intimate intermixing communication of all reactants, and provides mechanical agitation in a proper manner to achieve particles which are dry flowable, granular-like sand, and which can be easily removed and filtered from mill solution via discharge line 64.

The uranium peroxide precipitate is precipitated cleanly in a time in the order of seconds, and as completely and cleanly as possible. This is distinct from prior processes which often required up to four hours, often involved shutdowns and long drying times as well as the requirement of breaking up the peroxide in order that it be granular.

In accordance with the present invention for ore solution that have high vanadium content in the mill solution, typically on a mole ratio basis up to as much vanadium to uranium as 1:2, vanadium interference with uranium peroxide precipitation can be avoided where one of the reactants entering the system via reaction line 24, 26, 28 or 30 is a sodium sulfate solution. An amount should be used to dilute the reactant vessel volume by from 30% to 50%. It is not known precisely how the sodium sulfate solution works, but it is believed that use of sodium sulfate diluting solution actually causes the deposit of the uranium peroxide on crystals which are not exposed to high vanadium concentration. The uranium seems to precipitate in an environment having a reduced vanadium concentration because of the dilution effect caused by the sodium sulfate, even though the precipitation takes place before the dilution of the feeds necessarily becomes complete. Generally speaking, the sulfate concentration should be within the range from 15 grams of sulfate per liter to 30 grams of sulfate per liter, preferably 20–25 grams of sulfate per liter.

The operational time for the present process for complete precipitation is within the range of one second up to a few seconds. At any time of removal of moving mill solution from tank 12, there is no indication of incomplete precipitation. The precipitation is no longer rate limiting!.

The following experimental examples illustrate the process of the present invention using the reactor vessel as previously described and demonstrate the effect from use both with and without the reactor vessel and process of the present invention.

EXAMPLES

Synthetic mill solutions were prepared by adding appropriate amounts of Analytical Reagent grade sodium molybdate and sodium chloride and Purified grade vanadyl sulfate to a solution of uranium sulfate. The compositions of these feed solutions are given in Table I. After each run the time required to filter 0.4 liter of the product suspension on a 9 cm. Whatman 42 paper disk, using 15–20 inches of vacuum, was measured. However, as the precipitation was improved, filtration times became too short (much less than a minute) to differ significantly in most cases. It was then more useful to note the flowability of the air-dried product and the absence of any tendency of the solids to cake on the filter. The barrens were analyzed for uranium content by induction-coupled plasma atomic emission spectroscopy. Particle size distributions of the product were obtained using a Coulter Model TA-II particle size analyzer. Free moisture content of the wet precipitate was found by air-drying the sample at room temperature to constant weight. Samples of the dried powder were analyzed by x-ray diffraction to differentiate between tetra- and di-hydrate forms of the uranium peroxide and were analyzed chemically for vanadium, molybdenum, and sodium content; product particles were examined in the scanning electron microscope. Each of acid, alkaline and neutral processes were tested.

A. Acid Process

Preliminary batch precipitations confirmed the observations of Shabbir and Tame for the system at 25° C. This initial work also showed that a higher temperature was probably necessary to increase the rate of the reaction and to reduce the size of the equipment needed to make a continuous process attractive. A three stage cascade was used for the continuous runs, in recognition of the three sequential steps in the batch process—addition of reactants, adjustment to precipitation pH, and precipitation of the uranium peroxide.

Stage one, a 0.250 liter vessel, was used to mix the simulated mill solution (Table I) and the hydrogen peroxide at a pH of 1–2. The reactant mixture from stage one overflowed into stage two, a two liter vessel operated at 60° C. and designed for an average residence time, $\tau$, of one hour. Sodium hydroxide was added as needed to maintain a pH of 4–5, so that precipitation of the uranium peroxide would occur. Stage three, a two liter vessel, provided additional average residence time of one hour.

In the first run the flow rates were chosen to give a reactant ratio of 0.20 kg $H_2O_2$/kg $U_3O_8$, a 60 percent excess over the stoichiometric value of 0.121 and a little over the 57 percent excess found to be sufficient in batch processes at ambient temperature. The reaction was incomplete; uranium continued to precipitate, even overnight, in the product collection tank. Although the solids collected from the third stage during the run were reasonably coarse and filtered easily, the substantial amount of additional material which subsequently precipitated in the collection tank was extremely fine. This made the combined solids difficult to filter and handle.

In the second run the reactant ratio was increased to 0.30, a 150 percent excess of peroxide. Again, precipitation was incomplete and fines precipitated in the collection tank which followed stage three. In these first two runs, only simple mixing of the material by a laboratory stirrer in each stage was used; the solids in stages two and three were not well suspended. To correct this, the special reaction vessel shown diagrammatically in FIGS. 1 and 2 was used. The tank 10 was made of glass. The draft tube 36 was made of tantalum sheet, as were the baffles 52, 54, 56 and 58.

The two feeds to stage two were introduced into the outer region of the vessel from a position about 2 cm. above the fluid surface. The height of the draft tube and the stirring rate were adjusted so that a 1–2cm "waterfall" was maintained from the outer annulus into the draft tube 36. Transfer of the material from stage two to stage three, and removal of the product from stage three was accomplished by periodically siphoning the suspension rapidly from a position near the bottom of the vessels.

A third run, still using a reactant ratio 0.30 kg $H_2O_2$/kg $U_3O_8$, but with the method and means of the invention installed, gave substantially better results and demonstrated the importance of good agitation during formation of the precipitate. The product analysis, barrens analysis, and product filter time for this run is shown in the 60° C. Acid column in Table II. Also shown in Table II are approximate allowable limits on impurities in the product before price penalties are imposed. Although these limits vary among various purchasers of yellow cake, the numbers given in the table as "allowed" are useful as a guide. The impurity levels of the product are well within allowable limits, but the uranium content in the barrens, at 450 ppm as $U_3O_8$, is higher than published values for the batch process.

The product suspension filtered easily. The filter cake, which contained 22 percent free water, could be dried by allowing air to flow through it at ambient temperature for an hour. The dried product was flowable—that is, it could be poured off the filter paper. No actual cake was formed, so the dried material did not have to be broken up.

The particles of uranium peroxide produced had a rather narrow sized distribution ranging from about 40 micrometers to 20 micrometers. In this instance in practicing the process of the present invention it was a loose agglomerate of needle-like crystals characteristic of uranium peroxide.

Although a uranium concentrate of good quality could be obtained by continuous precipitation from a solution initially at low pH, a large excess of peroxide seemed to be required, and the uranium content of the barrens was relatively high.

B. Alkaline Process

Because uranium peroxide can also be precipitated from a solution initially at high pH, the possibility of developing a continuous "alkaline" process was investigated. Mill solution, hydrogen peroxide, and sufficient sodium hydroxide to raise the pH to a value of 10-11 were fed continuously at 25° C. to the first stage reactor, as shown in FIGS. 1-2. The overflow from stage one plus sufficient HCl to maintain a precipitation pH of 4-5 was added to stage two, which was again operated at 60° C.

Since a soluble di-peroxo complex is formed in alkaline solution, the stoichiometry requires a reactant ratio of 0.242 kg $H_2O_2$/kg $U_3O_8$—twice the value for the acid process. A ratio of 0.347, representing 43% excess peroxide, was used. The chloride level in the mill solution used for this run, as shown in Table I, was lower than that used in the acid process. However, when the additional amount introduced as hydrochloric acid in stage two is included, the chloride level in the precipitation vessel was very nearly the same as that in the mill solution for the acid process.

The results of this run are reported in the 60° C. Alkaline column in Table II. The product suspension was quite free of fines and filtered rapidly. The wet precipitate contained 14 percent free water and could be air-dried easily on the filter, after which it behaved much like dry sand. Molybdenum and vanadium levels in the product were lower than in the acid runs, and the uranium in the barrens was much lower. The product had a broad particle size distribution and consisted mostly of particles in the range of 30 to 110 micrometers.

A striking difference in the morphologies of the precipitates from the acid and the alkaline processes was observed. Large, spherical particles were obtained in the alkaline process. Rapid drying caused it to fracture, and the internal structure could be viewed. It was composed of fine needles radiating uniformly in all directions from the center, and may be referred to as a pherulite.

Despite the high purity and the superb handling properties of the product from the alkaline process, the large amount of peroxide required is an economic disadvantage; however, the runs demonstrate the usefulness of the reaction vessel and process with this system.

C. Neutral Process

A "neutral" process was used, which combined many of the advantages of both the acid and the alkaline processes. In the neutral process, the mill solution was fed to a reaction vessel of FIG. 2, stage one, along with sufficient sodium hydroxide to raise the pH to 3.0, so that the uranium would be as near to precipitation as was practical without risking premature precipitation of the hydrous oxide. Then, in stage two, maintained at 60° C., the hydrogen peroxide and sufficient sodium hydroxide to maintain the pH at 4-5 were added, directing all feeds to stage two to enter the solution at the same location. For this process, the stoichiometric requirement for precipitation was only 0.121 kg $H_2O_2$/kg $U_3O_8$. For the product described in the 60° C. Neutral column in Table II, a reactant ratio of 0.18 kg $H_2O_2$/kg $U_3O_8$ was used. This was only a 48 percent excess over the stoichiometric value. The vanadium level in the product, although higher than that in the other two processes, was still at an acceptable level, as were the other impurities. The uranium in the barrens was higher than that in the alkaline process. The precipitate particles were sperulites with properties similar to those from the alkaline process; the filtering, drying, and handling properties were similar even though the particles were slightly smaller and the free moisture content, at 26 percent, was higher.

Although the neutral process with stage two operated at 60° C. produced a good product, the elevated reaction temperature was considered undesirable because of the heating cost. Additional neutral process runs were made with the same reactant ratio, but with all stages at 25° C. The product analysis from these low temperature runs is shown in the 25° C. Neutral column in Table II. The vanadium content rose, but remained within acceptable limits; the uranium content in the barrens increased.

The product from the low temperature neutral process also had a much more narrow particle size distribution and a smaller average particle size than the material precipitated at 60° C., but it could be filtered and dried easily, and the wet precipitate contained only 15% free water. The air-dried concentrate displayed all the excellent handling characteristics that had been observed for the spherulitic powders from the alkaline process and the 60° C. neutral process. However, the particles formed in the 25° C. neutral process had yet a different morphology from those seen in all the earlier work. They were dense, approximately spherical agglomerates of smaller rectangular sub-units which appeared to be composed of fibers packed in a parallel fashion so that their principle axes lay in the direction of the longer side of the rectangles. The reaction vessel and precipitation technique was successful for this neutral process in providing desired morphology for the uranium peroxide precipitate.

TABLE I

Compositions of Synthetic Mill Solutions

| Component | Concentration (grams/liter) | | |
|---|---|---|---|
| | Acid Process | Alkaline Process | Neutral Process |
| $U_3O_8$ | 38 | 31 | 28 |
| $SO_4$ | 58 | 51 | 48 |
| $Cl^-$ | 20 | 7 | 7 |
| $V_2O_5$ | 1 | 1 | 1 |
| Mo | 1 | 1 | 1 |
| Na | 25 | 21 | 24 |

TABLE II

Analyses of Products and Barrens

| | Allowed* | Acid 60° C. | Alkaline 60° C. | Neutral 60° C. | Neutral 25° C. |
|---|---|---|---|---|---|
| Product (ppm) | | | | | |
| V | 1000 | 200 | 50 | 300 | 500 |
| Mo | 1000 | 50 | 20 | 20 | 20 |
| Na | 500 | 300 | 300 | 100 | 100 |
| Filter time (min) | | 3.0 | 2.5 | 1.5 | 2.6 |
| Percent free water, wet precipitate | | 22 | 14 | 25 | 15 |
| Uranium in barrens, as $U_3O_8$ (ppm) | | 450 | 25 | 95 | 220 |

*Typical values. Allowable levels vary among different purchasers of yellow cake.

Looking at Tables I and II, as well as the data earlier described, it is illustrated that three different continuous processes were developed for the recovery of uranium by precipitation with hydrogen peroxide. All three process produced a product of acceptable quality. Overall, the neutral process, when operated at 25° C., appeared to be the most economical. The practice with the method and means of the present invention to control the nature of the uranium peroxide precipitate proved superior to the old batch process. The batch methods currently in commercial use produce precipitates which are very fine and difficult to filter.

EXAMPLES USING HIGH VANADIUM MILL SOLUTION

An additional solution was made up using high vanadium mill solution as illustrated in Table III below.

TABLE III

High Vanadium Mill Solution

| Component | Concentration |
|---|---|
| U(VI) | 0.05M (21 g/l $U_3O_8$) |
| $SO_4$ | 0.25M (24 g/l $SO_4$) |
| Cl | 0.20M (7 g/l Cl) |
| V(IV) | 0.025M (2.3 g/l $V_2O_5$) |
| Mo(VI) | 0.01M (1.0 g/l Mo) |

Similar test runs as earlier described using the reaction vessel of the present invention are described in Tables IV and V below.

TABLE IV

Product and Barrens Data From a High Vanadium Run Using the Neutral Process Previously Described

| | 105 Minutes | 250 Minutes |
|---|---|---|
| PRODUCT | | |
| Mo | 100 ppm | 1000 ppm |
| V | <100 ppm | 1000 ppm |
| Na | 300 ppm | 500 ppm |
| BARRENS | | |
| U | 22 ppm | 600 ppm |

TABLE V

Feed Rates To Stage 2 Reaction Vessel In the High Vanadium Neutral Process

| Reactant | Concentration | Feed Rate |
|---|---|---|
| MILL SOLUTION | | 23 ml/min |
| $Na_2So_4$ | 0.25M | 50 ml/min |
| NaOH | 2.5M | to maintain pH 4-5 |
| $H_2O_2$ | 2.6M | 1.7 ml/min |

TABLE VI

Product and Barrens Data From the High Vanadium Process Compared With Those From the Low Vanadium 60° C. Neutral Process

| | Allowed* | 60° C. Neutral Process | High Vanadium Process |
|---|---|---|---|
| V | 1000 ppm | 300 ppm | 100 ppm |
| Mo | 1000 ppm | 20 ppm | 50 ppm |
| Na | 500 ppm | 100 ppm | 300 ppm |
| Barrens U | — | 95 ppm | 92 ppm |

*Typical values. Allowable levels vary among different purchasers of yellow cake.

From examining the above tables, it can be seen that the problems encountered in continuous precipitation of uranium peroxide from a uranium mill solution containing a high level of vanadium can be eliminated simply by the addition of a sodium sulfate solution feed, which simply dilutes the solution in the reactor. The high vanadium problems, i.e. incomplete uranium precipitation and excessive vanadium contamination of the product, are evidently caused by high concentration of vanadium in the bulk solution in the reactor, and a diluting feed reduces that concentration. Generally speaking, the amount of sulfate should be such to dilute the reactor solution in the order of from about 30% to about 50%.

What is claimed is:

1. A process of continuously precipitating easy-dry and flowable granular uranium peroxide from high vanadium content solutions, comprising:

introducing a uranium mill solution having a high vanadium content with a vanadium to uranium mole ratio up to about 1:2, and a peroxide reactant solution along with a sodium sulfate solution in an outer zone of a reaction precipitation tank which has an interiorly disposed draft tube having open upper and lower ends, and an agitation means for continuous agitation of reacting mill solution within said draft tube;

said draft tube defining an outer reaction zone between it and the walls of said precipitation tank and an interior reaction zone within said draft tube; and continuously agitating reacting mill solution within said draft tube to create a down draft of reacting mill solution and peroxide solution which flows out of the lower end of said mill tube upwardly through the outer reaction zone and back into the upper end of said draft tube; and continuously withdrawing from said tank precipitated easy-dry granular uranium peroxide.

2. The process of claim 1 wherein the amount of sodium sulfate solution is an amount sufficient to dilute the reactant vessel volume by about 30% to 50%.

3. The process of claim 1 wherein the sulfate concentration by the addition of sodium sulfate solution is maintained within the range of about 15 grams of sulfate per liter to about 30 grams of sulfate per liter.

4. The process of claim 3 wherein the amount of sulfate is within the range of from about 20 grams per liter to about 25 grams per liter.

* * * * *